United States Patent
Pettersson et al.

(10) Patent No.: US 10,041,788 B2
(45) Date of Patent: Aug. 7, 2018

(54) METHOD AND DEVICE FOR DETERMINING THREE-DIMENSIONAL COORDINATES OF AN OBJECT

(71) Applicant: HEXAGON TECHNOLOGY CENTER GMBH, Heerbrugg (CH)

(72) Inventors: Bo Pettersson, London (GB); Knut Siercks, Mörschwil (CH); Eugen Voit, Au (CH); Jürg Hinderling, Marbach (CH); Klaus Schneider, Dornbirn (AT); Benedikt Zebhauser, Rorschach (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 137 days.

(21) Appl. No.: 14/440,642

(22) PCT Filed: Oct. 31, 2013

(86) PCT No.: PCT/EP2013/072845
§ 371 (c)(1),
(2) Date: May 5, 2015

(87) PCT Pub. No.: WO2014/068073
PCT Pub. Date: May 8, 2014

(65) Prior Publication Data
US 2015/0292876 A1    Oct. 15, 2015

(30) Foreign Application Priority Data
Nov. 5, 2012    (EP) ..................................... 12191195

(51) Int. Cl.
*H04N 7/18*    (2006.01)
*G01B 11/25*    (2006.01)
(Continued)

(52) U.S. Cl.
CPC ........ *G01B 11/2545* (2013.01); *G01B 11/002* (2013.01); *G01C 15/00* (2013.01); *G01C 15/002* (2013.01); *G01S 17/89* (2013.01)

(58) Field of Classification Search
CPC .... G01B 11/002; G01C 15/00; G01C 15/002; G01S 17/89
(Continued)

(56) References Cited

U.S. PATENT DOCUMENTS 6,515,658 B1 *    2/2003    Endoh .................... G06T 17/00
                                                      345/419
6,700,669 B1    3/2004    Geng
(Continued)

FOREIGN PATENT DOCUMENTS

CN    101582165 A    11/2009
EP    1 650 725 A1    4/2006
(Continued)

OTHER PUBLICATIONS

Extended European Search Report dated Mar. 12, 2013 as received in Application No. 12191195.2.

*Primary Examiner* — Helen Shibru
(74) *Attorney, Agent, or Firm* — Maschoff Brennan

(57) ABSTRACT

Some embodiments of the invention relate to an optical measuring device for determining 3D coordinates of an object. The optical measuring device may include a projector device for illuminating the object with at least one predefined pattern; at least one PSA camera for capturing a 2D image of the pattern as reflected from the object; computing means for measuring a sequence of brightness values of at least one 2D image point from the 2D images, and calculating a 3D coordinate of an object point which is correlated with the measured sequence of brightness values of the 2D image point. The optical measuring device may also include a TOF camera for capturing at least one range
(Continued)

image of the object, the range image including distance information of the object for the dissolution of ambiguity in calculating the 3D coordinate.

17 Claims, 8 Drawing Sheets

(51) Int. Cl.
  *G01S 17/89* (2006.01)
  *G01C 15/00* (2006.01)
  *G01B 11/00* (2006.01)
(58) Field of Classification Search
  USPC .......................................... 348/136, 42, 135
  See application file for complete search history.

(56) References Cited

U.S. PATENT DOCUMENTS

| | | | | |
|---|---|---|---|---|
| 7,071,935 | B1* | 7/2006 | Deering | G06T 9/00 345/419 |
| 8,187,097 | B1 | 5/2012 | Zhang | |
| 8,330,804 | B2* | 12/2012 | Lutian | G01S 17/89 345/419 |
| 8,934,002 | B2* | 1/2015 | Ham | G02B 27/0093 348/42 |
| 2003/0179194 | A1* | 9/2003 | Robert | G06T 17/20 345/419 |
| 2005/0035314 | A1 | 2/2005 | Yamaguchi | |
| 2007/0047768 | A1* | 3/2007 | Gordon | G06K 9/00255 382/103 |
| 2008/0044060 | A1 | 2/2008 | Satoh et al. | |
| 2011/0211045 | A1* | 9/2011 | Bollano | G06T 15/20 348/46 |
| 2011/0242281 | A1* | 10/2011 | Schmidt | A61C 19/04 348/46 |
| 2012/0038631 | A1* | 2/2012 | Mayhew | G06F 3/04815 345/419 |
| 2012/0046568 | A1 | 2/2012 | Soatto et al. | |
| 2012/0219699 | A1* | 8/2012 | Pettersson | B05B 12/122 427/8 |
| 2012/0229611 | A1* | 9/2012 | Pellman | G03B 15/05 348/49 |
| 2013/0100250 | A1* | 4/2013 | Raskar | H04N 13/02 348/46 |
| 2013/0258073 | A1* | 10/2013 | Kozak | G09G 3/003 348/56 |
| 2013/0278787 | A1* | 10/2013 | Shpunt | G01B 11/25 348/218.1 |
| 2014/0139561 | A1* | 5/2014 | Lee | G09G 3/003 345/690 |
| 2014/0152975 | A1* | 6/2014 | Ko | G01S 17/89 356/5.01 |
| 2014/0320603 | A1* | 10/2014 | Pettersson | G01C 15/002 348/46 |
| 2014/0347676 | A1* | 11/2014 | Velten | G01B 11/2513 356/614 |
| 2015/0176792 | A1* | 6/2015 | Hager | F21S 48/1131 362/510 |
| 2015/0367816 | A1* | 12/2015 | Schindler | G01S 17/89 356/5.01 |
| 2016/0330433 | A1* | 11/2016 | Shen | G01S 1/00 |
| 2017/0011259 | A1* | 1/2017 | Majumdar | G01B 11/14 |

FOREIGN PATENT DOCUMENTS

| | | |
|---|---|---|
| JP | 2002-109517 A | 4/2002 |
| WO | 2008/046663 A2 | 4/2008 |
| WO | 2010/136507 A1 | 12/2010 |

* cited by examiner

METHOD AND DEVICE FOR DETERMINING THREE-DIMENSIONAL COORDINATES OF AN OBJECT

FIELD OF THE INVENTION

The present invention relates to a method and a device for determining three-dimensional coordinates of an object.

BACKGROUND

In various technical fields there are a multitude of applications in which an accurate determination of three-dimensional (3D) coordinates of an object is required; among these technical fields are, for example, mechanical engineering, automotive industry, ceramic industry, mining industry, orthopedics, prosthetic dentistry and jewelry industry. The object to be measured can have any shape and size.

One particular application of the determination of 3D coordinates of an object involves earthwork operations, in which earthmoving machines, such as excavators with buckets or bulldozers with blades, alter the topography of a site. The progress of earthwork operations is surveyed by an optical measuring device which determines the actual 3D shape of the site and the 3D positions of buckets or blades of the earthmoving machines. Based on the repeatedly determined 3D shape representation of the site and of the 3D positions of buckets or blades, differences and deviations with a planed 3D shape representation of the site are detected and the progress of the earthwork operations is determined.

The optical measuring device utilizes a contactless sensor, such as a structured-light 3D scanner. In such a system, a projector is used to illuminate the object with a predefined pattern. A two-dimensional (2D) image of the pattern as reflected from the object is captured by a camera. The captured pattern is distorted relative to a known reference pattern. This distortion is caused by the 3D shape representation of the object. The identity of each object point can be encoded spatially (with a single pattern), temporally (with a sequence of patterns) or in a combination of both spatial and temporal encoding. The larger the number of object points, the larger is the number of image points with individual code words and, thus, the more complicate the structure of the pattern.

By illuminating the object with a sequence of temporally varying patterns such as a stripe pattern with a binary encoding or a Gray encoding, a temporal sequence of 2D images with black and white brightness values of reflected stripe patterns is captured. Brightness values of one and the same 2D image point out of the captured sequence of 2D images are measured, allowing a correlation of the 2D image point with an individual stripe which is reflected from an object point. As the individual stripe on the stripe pattern of the projector and the 2D image point of the camera are separated by a device distance, and as the projector device axis of the projected and the captured stripe patterns enclose an illumination angle, the knowledge of the device distance and the illumination angle permits a triangulation of the 3D coordinate of the correlated object point.

In WO 2008/046 663 A2 a structured-light 3D scanner of the prior art is disclosed having a projector and two photo sensor array (PSA) cameras in one common housing. The two PSA cameras have charge-coupled device (CCD) sensors with several millions of pixels. Each 2D image of the PSA cameras captures a stripe pattern as reflected from the object with a resolution of several million image points.

The PSA cameras capture the stripe pattern simultaneously but from different points of view. The optical axes of the PSA cameras have an offset angle of 5° to 20°. The PSA cameras are mounted in a rigid manner in the housing with a constant mutual distance. In accordance with the epipolar constraint, each 2D image point of a first one the two PSA cameras has a corresponding 2D image point on a known epipolar line of the second one of the two PSA cameras. With the known mutual distance and the known offset angle, the law of sines can be applied to calculate for a sequence of measured brightness values for corresponding 2D image points of the two PSA cameras the 3D coordinate of a correlated object point.

In order to accurately determine the 3D coordinates of an object in accordance with the solution described in WO 2008/046 663 A2, the object must be illuminated with a sequence of five to eleven stripe patterns. For a projector with a typical repetition rate of 30 Hz, the resulting measuring time of 3D coordinates of the object lies in the range of 160 ms and 370 ms and thus is rather slow. For a complete determination of an object which is embedded in the site, an assembly of several sequences from different points of view would be necessary. Thus, a determination of 3D coordinates of an embedded object is even more time-consuming and, in addition, requires elevated computing performance for assembly of several sequences from different points of view. This solution would be quite expensive, though.

Moreover, the intensity and nature of ambient light may influence the level of confidence of the captured 2D images. Under operation conditions, in the open and in any weather condition, ambient light may induce ambiguity in the captured 2D images, which alters the black and white brightness patterns and makes it difficult to correctly measure the brightness values and to calculate a 3D coordinate of a correlated object.

Moreover, certain shapes of an object cannot be resolved unambiguously with a 2D image even without the influence of ambient light. This ambiguity may then lead to a misinterpretation of the position or shape of a feature of the object. For instance, under certain circumstances it cannot be discovered without capturing further 2D images whether the surface of a sphere is positively or negatively arched or at which side the surface of a diagonal wall is more distant.

Thus, there is a need for a quick and low-cost determination of 3D coordinates of an object. There is also a need for a reliable determination of 3D coordinates of an object, even under the conditions of earthwork operations. Moreover, there is a need for an ambiguity-free determination of 3D coordinates of an object.

SUMMARY

Some embodiments of the present invention provide a method and a device for unambiguously and reliably determining 3D coordinates of an object.

Some embodiments provide such a method and device for use under ambient light conditions and under the conditions of earthwork operations.

Some embodiments of the invention provide such a method and device that allows a faster determination of 3D coordinates of an object and at low costs.

According to the present invention, a device for determining 3D coordinates of an object by means of structured-light measurement with a photo sensor array (PSA) camera additionally comprises a range camera having a range image (RIM) sensor with a sensor array. Such a range camera, for instance, is disclosed in WO 2010/136 507 A1. The range camera according to the invention is adapted to be directed to the object and is capable to provide a range image of the object, for instance by means of time-of-flight (TOF) measurement. Range pixels of the range image correspond to a 3D-position of a target point of the object and can be used for the creation of a point cloud of the object. The term "range images" in the terminology of the invention generally means a sequence of range images shots, but can also mean a range image stream taken by a streaming range camera.

Range imaging (RIM) in general is known as a technology which is used to produce a 2D-image showing the distance to points in a scene from a specific point. The resulting image which is generally called range image has pixel values which correspond to the distance of the respective target point at the object. For instance, brighter values mean shorter distances or vice versa. It is even possible to properly calibrate the sensor producing such a range image which enables that pixel values can be given directly in physical units such as meters. For each of the pixels of the range image (range pixels) one separate sensor that is capable to measure a distance is assigned. Since the distance of the target point assigned to the respective sensor is known, the 3D-position of the target point can be exactly determined. Thus, by using the range imaging technology, it is possible to identify each of the measurement points of an object, and to even determine 3D-data of each measurement point. However, whereas the 3D-positions determined in this manner might not be sufficiently accurate, because the amount of pixels of a range image is rather small compared to a PSA camera, the information is still sufficient to determine the shape of the object to be measured in the range image.

With the range images of the object it is possible to reduce or dissolve ambiguities in the structured-light measurement with respect to the shape of the object.

According to the present invention, a method for determining 3D coordinates of an object by an optical measuring device comprises a structured-light measurement with
illuminating the object with a predefined pattern or a sequence of predefined patterns;
capturing a 2D image or a sequence of 2D images of the pattern as reflected from the object;
measuring brightness values of at least one 2D image point from the 2D image; and
calculating a 3D coordinate of an object point which is correlated with the measured sequence of brightness values of the 2D image point.

According to the invention, the method further comprises capturing with a range camera at least one range image of the object, the range image comprising distance information of a plurality of points of the object. According to the invention, the range image is then considered in the calculation of the 3D coordinate. In particular, the range camera works according to the time-of-flight (TOF) principle.

According to the invention, also coloured patterns can be projected; the term brightness value therefore is also to be understood in such a way that it may comprise other attributes of the reflected light such as the wavelength or colour.

In a preferred embodiment, the range image is used for dissolving ambiguity in the calculation of the 3D coordinate: If the structured-light measurement has produced an ambiguity in the 3D coordinates of a group of object points on a certain feature of the object, the distance information of a range image point or a group of range image points can be used for a quick and reliable ambiguity dissolution.

For instance, if the shape of the feature or the position of the group of object points cannot be determined without ambiguity by means of the structured-light measurement only—i.e. if there are more then one possible shapes or positions that could be calculated from the data generated by the structured-light measurement—one or more range image points deliver information about the (rough) shape of the very feature and/or the exact position of at least one of the image points of the group of image points, so that the ambiguity is dissolved—i.e. the correct shape of the possible shapes or the correct position of the possible positions is detected.

The ambiguity can be dissolved by verifying one of the possibilities of the ambiguity or through falsification of all but one possibility. If due to the lower resolution of the range image there is no matching data for a certain ambiguous group of image points the ambiguity can also dissolved by validating the plausibility of each possibility based on the range image.

In one embodiment the method further comprises
determining, whether a brightness value or a sequence of brightness values of a particular 2D image point comprises ambiguity; and
in case of ambiguity using the distance information of at least one point of the plurality of points of the object for dissolving the ambiguity.

According to a further aspect of the invention, the method comprises capturing with the range camera an amplitude image of the object, the amplitude image comprising a brightness information for each of the plurality of points, in particular wherein for dissolving ambiguity in the calculation of the 3D coordinate the range image and the amplitude image are combined to a 3D image of the object. Thus, the present invention provides an additional capture of a 3D image of the object and an extraction of a 3D coordinate of the correlated object point based on distance information from that additionally captured 3D image.

According to a further aspect of the invention, in case of ambiguity in the captured 2D images, the calculation of a 3D coordinate of an object point which is correlated to a 2D image point in the 2D images is prevented. For each 3D image point a 3D image comprises radially measured distance information between the 3D image point and an object point. As a 3D image comprises thousands of image points, this method may be repeated for a plurality of object points, allowing a fast, cost-effective and reliable determination of 3D coordinates of an object.

According to a further aspect of the invention, the method comprises determining whether a sequence of brightness values of a particular 2D image point comprises ambiguity; and, in case of ambiguity, linking the particular 2D image point with a particular 3D image point of a particular correlated object point and extracting a 3D coordinate of the particular correlated object point from the linked particular 3D image point.

So in case of ambiguity, if a calculation of a 3D coordinate of a particular correlated object point from a sequence of brightness values of a particular 2D image point is not possible, a 3D image which includes a particular 3D image point of the particular correlated object point is captured. The particular 2D image point is linked to the captured particular 3D image point by using radial measured distance information between the linked particular 3D image point and the particular correlated object point to extract a 3D coordinate of the particular correlated object point. Again, this method may be repeated for a plurality of object points, allowing a fast, cost-effective and reliable determination of 3D coordinates of an object.

BRIEF DESCRIPTION OF THE DRAWINGS

The invention in the following will be described in detail by referring to exemplary embodiments that are accompanied by figures, in which FIGS. 1a-b schematically shows an optical measuring means of the prior art.

DETAILED DESCRIPTION

Figure 1A:
Figure 1A:
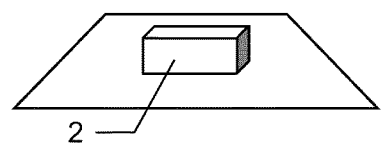
Figure 1B:
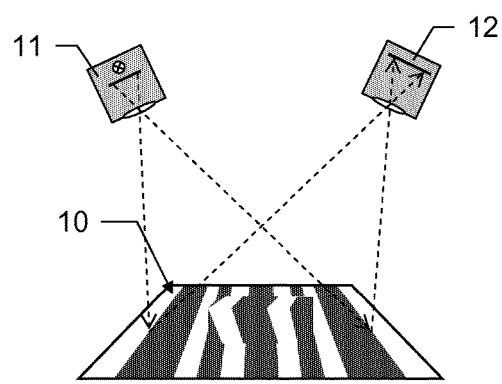

In FIGS. 1a and 1b a concept known from prior art is schematically depicted. FIG. 1a shows an optical measuring device for determining three-dimensional coordinates of an object by means of structured-light measurement as it is known from prior art. The device comprises a projector device 11 and a photo sensor array (PSA) camera 12, both of which being directed to an object 2 to be measured. In FIG. 1b a predefined pattern 10 is projected by the projecting device 11 onto the object 2. The PSA camera 12 captures at least one 2D image of the object 2 with the projected pattern 10 in order to determine three-dimensional coordinates of the object.

Under certain circumstances, at some regions of the object 2 ambiguities within the determination of the coordinates may occur, normally making further measurements with different predefined patterns 10 necessary in order to determine unambiguous coordinates of the object 2.

Figure 2:
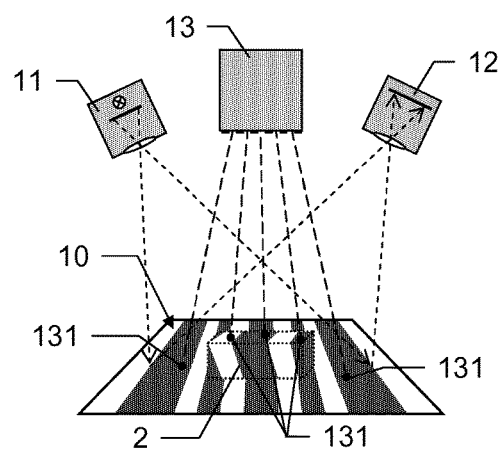
FIG. 2 schematically shows an optical measuring means according to FIGS. 1a-b having an additional TOF camera.

In FIG. 2 the general concept of the present invention is schematically depicted. According to the invention, the optical measuring device of FIGS. 1a-b additionally comprises a further range camera working according to the time-of-flight principle (TOF camera 13). The TOF camera 13 is directed to the object 2 and adapted to measure distances to a multitude of points 131 on and around the object 2. The data generated by the TOF camera 13 and of the PSA camera 12 then can be compared in order to dissolve ambiguities and to avoid the relatively lengthy capture of further 2D images of the object 2 with different patterns.

Figure 3A:
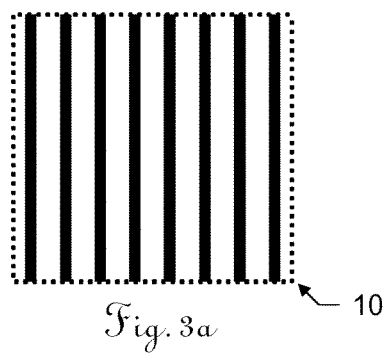
FIGS. 3a-d schematically show a predefined pattern of a projector device under different measurement conditions creating ambiguities.

In the FIGS. 3a-d a predefined pattern 10 is depicted under some measurement conditions that might occur when structured-light measurement is used in the open, for instance for surveying earthwork operations. FIG. 3a shows the predefined pattern 10 projected in darkness on a uniformly reflective flat surface.

Figure 3B:
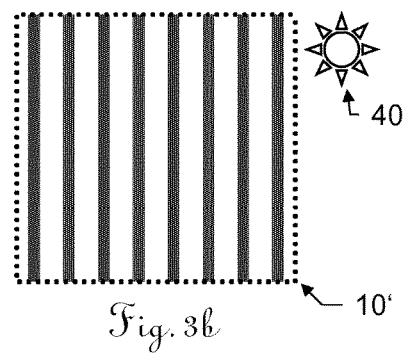

FIG. 3b shows the same pattern 10' projected under the influence of bright ambient light, for instance daylight 40. Due to the ambient light the contrast of pattern 10' is reduced compared to that of pattern 10 of FIG. 3a.

Figure 3C:
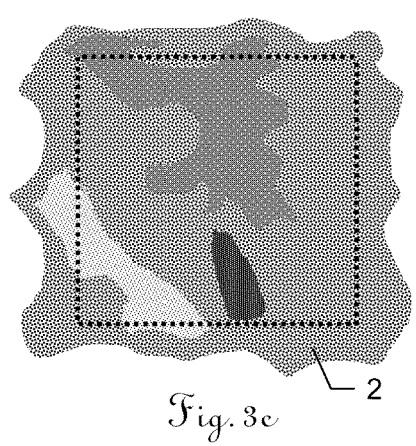

FIG. 3c shows an object 2 to be measured, the surface of which—in contrast to that of FIG. 3a—not being uniformly reflective.

Figure 3D:
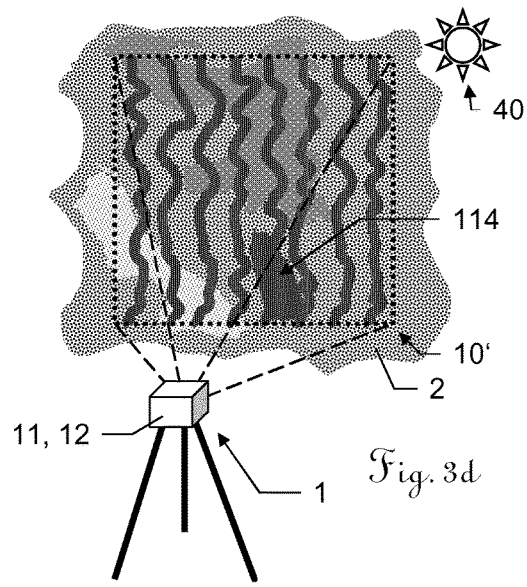

In FIG. 3d under the influence of daylight 40 the pattern 10' is projected on this object 2 by an optical measuring device 1 with a projector device 11 and at least one PSA camera 12. Due to the reduced contrast of the pattern 10' and the uneven reflectivity of the object's surface, the PSA camera 12 cannot unambiguously determine three-dimensional coordinates at an area 114 of the object 2.

Figure 4A:
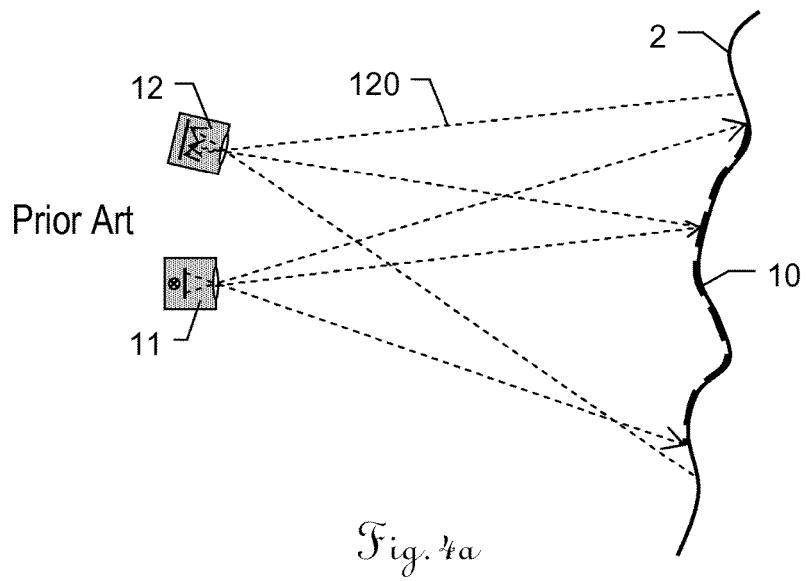
FIGS. 4a-b schematically show an optical measuring means of the prior art.
Figure 4B:
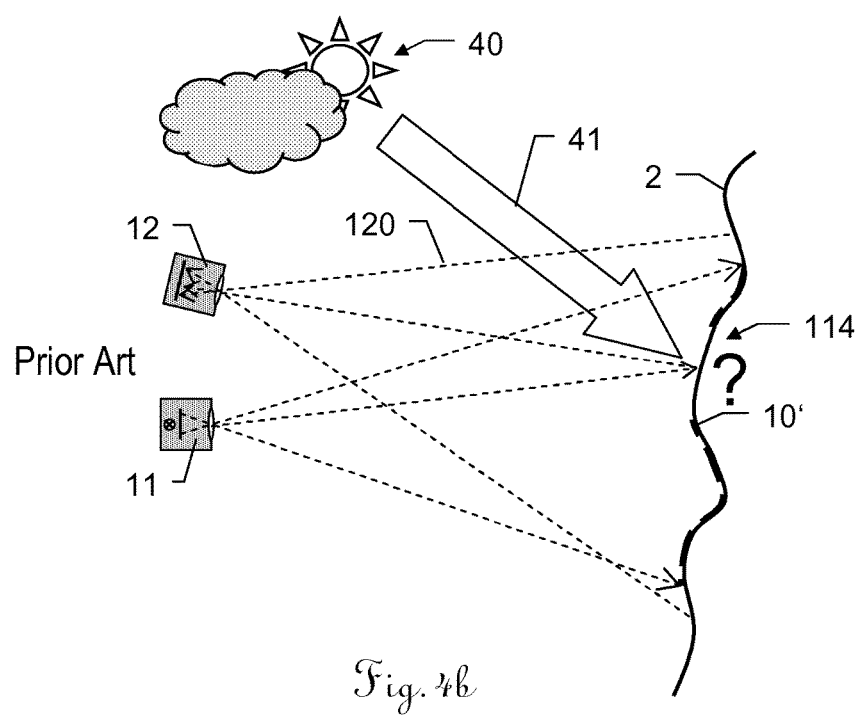

In FIGS. 4a and 4b an optical measuring device for determining three-dimensional coordinates of an object 2 by means of structured-light measurement is depicted as it is known from prior art. The device comprises a projector device 11 and a photo sensor array (PSA) camera 12, both of which being directed to an object 2 to be measured.

In FIG. 4a a predefined pattern 10 is projected by the projecting device 11 onto the object 2. The PSA camera 12 captures at least one 2D image 120 of the object 2 with the projected pattern 10 in order to determine three-dimensional coordinates of the object.

In FIG. 4b varying ambient light is added, in form of daylight 40. Rays of sunlight 41 move over the object 2, whereas other areas remain shaded, for instance through clouds, trees or other shadow-casting objects. Where the sunlight 41 meets the object 2, the pattern 10' is glared, leading to ambiguities in the identification of the pattern at these areas 114, so that ambiguities are created in the determination of the three-dimensional coordinates.

Figure 5:
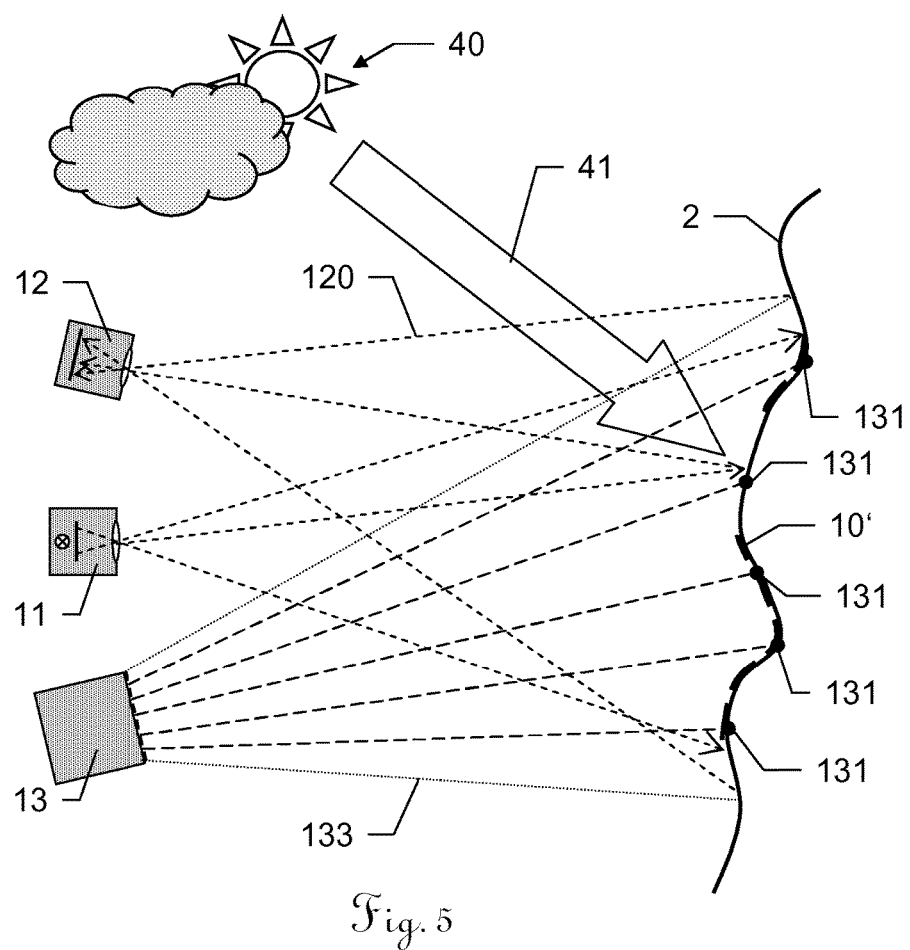
FIG. 5 schematically shows an optical measuring means according to FIGS. 4a-b having an additional TOF camera.

FIG. 5 shows the optical measuring device of FIGS. 4a-b, according to a second embodiment of the invention, additionally comprising a further TOF camera 13. The TOF camera 13 is directed to the object 2 and measures distances to a plurality of points 131 on and around the object 2 in a range image 133. The range image comprises distance information of the plurality of points 131 of the object 2, so that a point cloud may be generated. The range image 133 is then considered in the calculation of 3D coordinates of the object 2. In case of an ambiguity in the structured-light measurement, distance information of the points 131 of the object 2 can be used to dissolve the ambiguity.

Figure 6:
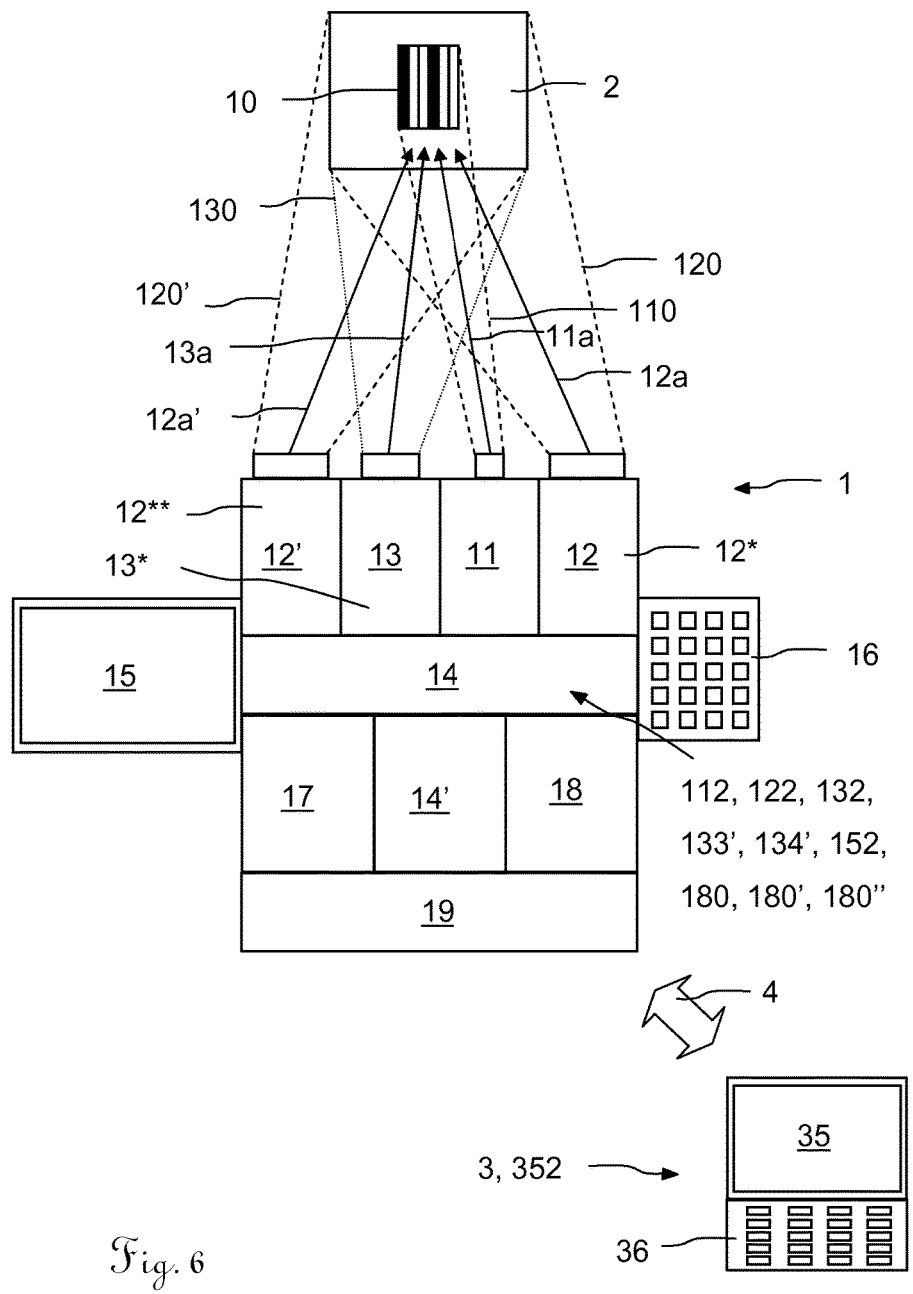
FIG. 6 schematically shows a portion of an exemplary embodiment of an optical measuring device according to the invention.

In FIG. 6 an embodiment of an optical measuring device 1 with a projector device 11, at least one photo sensor array (PSA) camera 12,12' and a range camera 13 working according to the time-of-flight principle (time-of-flight camera) is depicted. The optical measuring device 1 also comprises an internal display device 15, an internal input device 16, a tangible machine-readable storage medium 17 and computing means 18. Communication between at least one of the projector device 11, the PSA camera 12,12', the TOF camera 13, the internal display device 15, the internal input device 16, the tangible machine-readable storage medium 17 or the computing means 18 occurs by means of an internal bus device 14 of the optical measuring device 1. The internal bus device 14 may be a standard computer bus, such as a PCI (peripheral component interconnect). The optical measuring device 1 comprises an electric power supply device 19 and an internal bus interface device 14', the latter for a communication with an external computing means 3 by means of an external bus device 4. The external bus device 4 may be a wired standard computer bus such as a universal serial bus (USB) or a wireless standard computer bus such as Bluetooth™. The external computing means 3 comprises an external display device 35 and an external input device 36.

The projector device 11 comprises a light source such as a liquid crystal display (LCD) or a liquid crystal on silicon display (LCOS) to illuminate the object 2 with a sequence of predefined patterns 10. The pattern 10 may be a video signal of a black and white stripe pattern with a binary encoding or Gray encoding; the stripes may have variable width sizes and variable separation distances. The projector device 11 projects the pattern 10 under a projector device point of view 11* in a cone-shaped projection along a projection axis 11a on at least a portion of the object 2. In FIG. 6, the delimitation of the cone-like projection of the pattern 10 is indicated by a broken line, the projection axis 11a being situated essentially in the centre of the cone-shaped projection. The projector device 11 outputs a digital projector data signal 112. The projector data signal 112 comprises at least one coordinate of the projection axis 11a. The projector data signal 112 can be displayed on the display device 15, 35 and be interpreted by the computing means 18. The projector data signal 112 can be stored on the tangible machine-readable storage medium 17.

The PSA camera 12,12' is a CCD based camera or complementary metal-oxide semiconductor (CMOS) based camera which captures 2D images 120,120' with a high image resolution of several million pixels. Preferably, at least two PSA cameras 12,12' are provided. A first PSA camera 12 captures a sequence of first 2D images 120 at a first point of view 12*; a second PSA camera 12' captures a sequence of second 2D images 120' at a second point of view 12**. The 2D images 120,120' are captured simultaneously. The first and second points of view 12*,12** are fixedly positioned at a distance of some centimeters in the housing of the optical measuring device 1, so that the PSA camera axes 12a,12a' point towards the object 2 under an offset angle of 5° to 20°.

The field of view of the PSA camera 12, 12' is in the range of 30° to 70°. The brightness has a dynamic range of between 20 dB and 100 dB. The PSA camera 12,12' may have a zoom function for varying the field of view of the object 2. The zoom function may be realized as a digital zoom and/or as an optical zoom lens. In FIG. 6, the delimitation of the 2D image 120,120' is indicated by a broken line. The 2D image 120,120' comprises at least a portion of the object 2 and of the pattern 10 as reflected from the object 2. The stripe pattern 10 as reflected from the object 2 is captured with the resolution of a 2D image point 121,121' of the 2D image 120,120'. Individual stripes form black brightness values on the 2D image point 121,121', separation distances between individual stripes form white brightness values on 2D image points 121,121'. For each captured 2D image 120,120', the PSA camera 12,12' issues a digital 2D image data signal 122. The 2D data signal 122 can be displayed on the display device 15,35. The 2D data signal 122 can be interpreted by the computing means 18. The 2D data signal 122 can be stored on the tangible machine-readable storage medium 17.

Figure 7A:
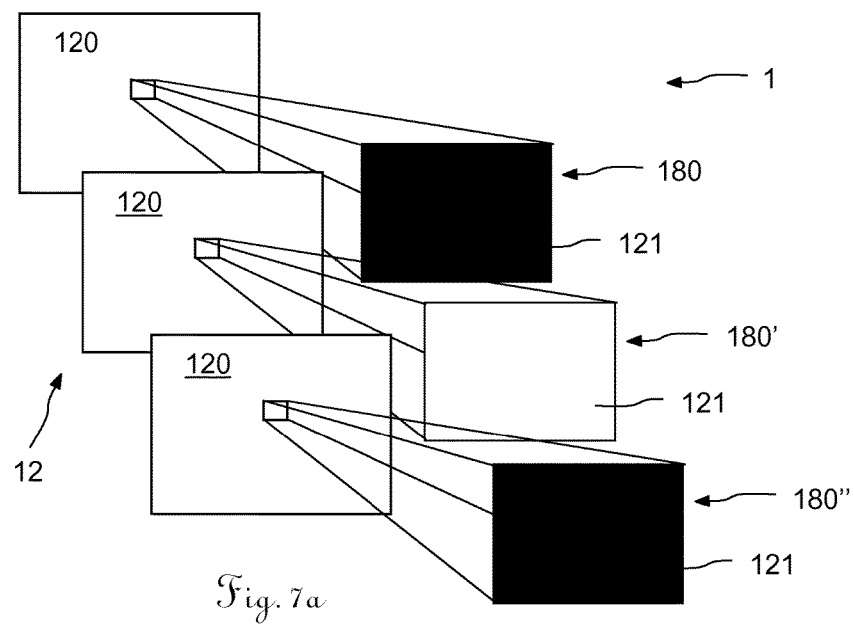
FIG. 7a schematically shows an exemplary embodiment of a sequence of brightness values measured without ambiguity at a first point of view by the optical measuring device according to FIG. 6.
Figure 7B:
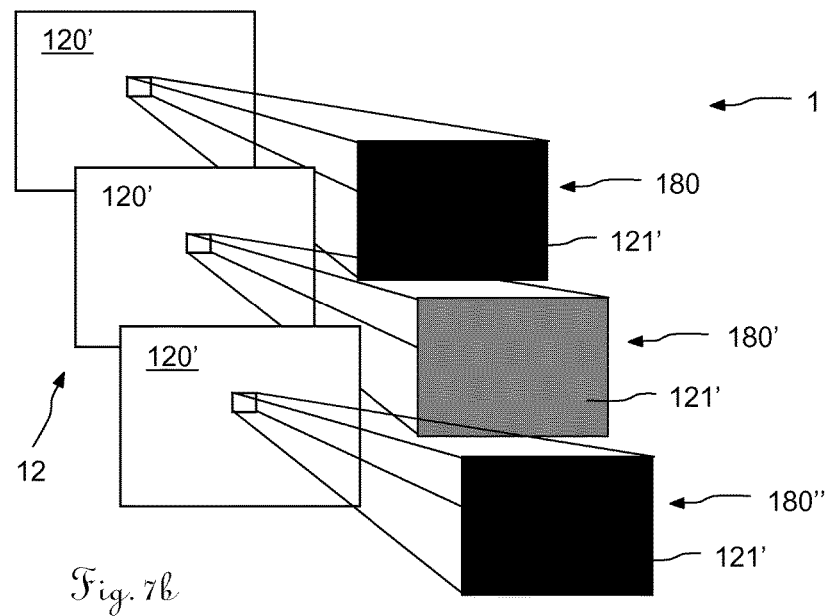
FIG. 7b schematically shows the exemplary embodiment of a sequence of brightness values according to FIG. 7a measured with ambiguity at a second point of view by the optical measuring device according to FIG. 6.

According to FIG. 7a, the first PSA camera 12 captures a sequence of three 2D images 120 at a first point of view 12*; according to FIG. 7b, the second PSA camera 12' captures a sequence of three 2D images 120' at a second point of view 12**. A sequence of three brightness values 180,180',180" is measured for the same 2D image point 121,121' of the 2D images 120,120'.

According to FIG. 7a, the sequence of brightness values 180,180',180" consists of a first black brightness value 180, a second white brightness value 180' and a third black brightness value 180". This sequence is free from ambiguity induced by ambient light, so that the brightness of the brightness values 180,180',180" can be unambiguously determined as being either black or white.

According to FIG. 7b, the sequence of brightness values 180,180',180" consists of a first black brightness value 180, a second grey brightness value 180' and a third black brightness value 180". This sequence comprises an ambiguity induced by ambient light. The brightness of the second grey brightness values 180' therefore cannot be unambiguously determined as being either black or white. Thus, the two sequences of brightness values 180,180',180" are not identical and the epipolar constraint for calculating the 3D coordinate 21 of a correlated object point 20 is not fulfilled, which makes it impossible to determine the 3D coordinate 21 of the particular object point 20 which is correlated to this particular 2D image point 121,121'.

In this regard the invention provides a solution by means of a TOF camera 13. The TOF camera 13 has a light source, such as a laser diode or a light emitting diode (LED), to illuminate the object 2. The TOF camera 13 operates on the time-of-flight principle. Back-scattered light from the object 2 is captured by a semiconductor detector such as a CCD or a CMOS. Depending on the distance to the object 2, the light is temporally delayed, resulting in a phase difference between a transmitted signal and a received signal. The TOF camera 13 captures range images 133 at a frame grabber rate of down to ten milliseconds and from a TOF camera point of view 13*. This TOF camera point of view 13* is fixedly placed at a mutual distance of some millimeters or centimeters with respect to the projector device 11 and the PSA cameras 12,12' in the housing of the optical measuring device 1, so that the TOF camera axis 13a points towards the object 2 in an angle which differs by some degree from the angles of the points of view 11*,12*,12** of the projector device 11 and the PSA cameras 12,12'.

The TOF camera 13 captures range images 133 at a frame grabber rate of down to ten milliseconds. The field of view of the TOF camera 13 is in the range of 30° to 70°. The centre of the field of view of the TOF camera 13 is the TOF camera axis 13a. Currently, the image resolution of the TOF camera 13 is limited to some several thousands pixels. In the following, these pixels are designated 3D image points 131.

Figure 8:
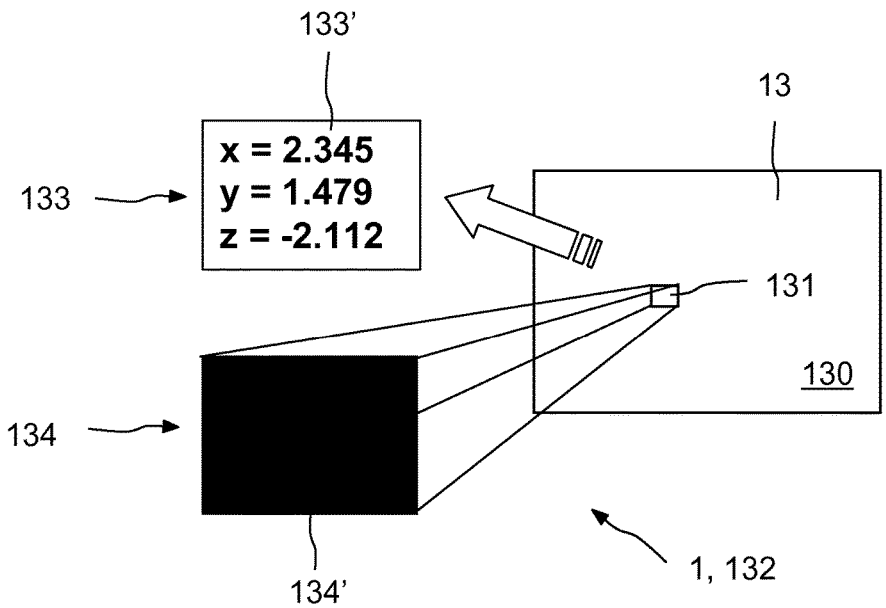
FIG. 8 shows an exemplary embodiment of a 3D image captured by an optical measuring device according to FIG. 6.

According to FIG. 8, a range image 133 and an amplitude image 134 are combined to a 3D image 130. The range image 133 comprises for each 3D image point 131 a radially measured distance information 133' between the 3D image point 131 and an object point 20. The distance information 133' may be expressed as a set of Cartesian coordinates; any other coordinate system may be also used. The accuracy of the distance information 133' amounts from one millimeter to several centimeters over a distance range of 0.5 meters to 60 meters. The amplitude image 134 comprises for each pixel the brightness information 134' of the received signal.

The brightness information 134' has a dynamic range of between 20 dB and 60 dB. In FIG. 6, the delimitation of the 3D image 130 is indicated by a dotted line. The 3D image 130 comprises at least a portion of the object 2 and of the pattern 10 as reflected from the object 2. For each captured 3D image point 131, the TOF camera 13 issues a digital 3D image data signal 132 with a distance information 133' and a brightness information 134'. The 3D data signal 132 can be displayed on the internal display device 15 as internal 3D image representation 152 and/or on the external display device 35 as external 3D image representation 352. The 3D data signal 132 can be interpreted by the computing means 18. The 3D data signal 132 can be stored on a tangible machine-readable storage medium 17.

By using a reference point of the optical measuring device 1, it is possible to establish a linkage between a particular 2D image point 121,121' for which the sequence of brightness values 180,180',180" comprises ambiguity and a particular 3D image point 131 of an object point 20 which is correlated with the ambiguous sequence of brightness values 180,180', 180" of the particular 2D image point 121, 121'. For doing so, the projector device 11, the PSA camera 12,12' and the TOF camera 13 are rigidly mounted in the housing of the optical measuring device 1. A reference point is defined which may be one of a coordinate of the projector device axis 11a, a coordinate of a PSA camera axis 12a,12a' or a coordinate of the TOF camera axis 13a. Any other reference point in the optical measuring device 1 may be used. A first geometrical relationship links the coordinate of the particular 2D image point 121,121' from the 2D image 120,120' of the PSA camera 12,12' with the coordinate of the reference point. The coordinate of the particular 2D image point 121,121' may be issued with the 2D image signal 122. The coordinate of the 2D image point 121,121' precisely locates a pixel on the CCD or CMOS sensor of the PSA camera 12,12'. The mutual distance between the PSA camera 12,12' and the reference point as well as the point of view **12\*,12\*\* of the PSA camera 12,12' and the reference point are known. A second geometrical relationship links the coordinate of the reference point with the coordinate of a particular 3D image point 131. Again the mutual distance between the reference point and the TOF camera 13 as well as the point of view of the reference point and the TOF camera point of view 13\* are known. By knowing the pixel number and the pixel size of the CCD or CMOS sensor of the PSA camera 12,12' and of the CCD or CMOS sensor of the TOF camera 13, a size ratio of the CCD or CMOS sensor of the PSA camera 12,12' and of the CCD or CMOS sensor of the TOF camera 13 can be determined. By using the coordinate of the particular 2D image point 121,121' and the size ratio of the CCD or CMOS sensor of the PSA camera 12,12' and the CCD or CMOS sensor of the TOF camera 13, a coordinate of the particular 3D image point 131 can be calculated, which coordinate of the particular 3D image point 131 precisely locates a pixel on a CCD or CMOS sensor of the TOF camera 13. A third geometrical relationship links the coordinate of the particular 3D image point 131 with the coordinate of a particular object point 20. This information provides from the radial measured distance information 133' between the particular 3D image point 131 and the particular object point 20**.

The optical measuring device 1 comprises a computing means 18 with a central processing unit (CPU) and a tangible machine-readable storage medium 17 such as a read-only memory (ROM) or a random-access memory (RAM). The method according to the invention is stored in the machine-readable storage medium 17. The method is stored for example in the form of a computer programme product. The computer programme product is loaded as a computer programme into the computing means 18 and the loaded computer programme is executed by the computing means 18. The computing means 18 interprets instructions of the loaded and executed computer programme as well as instructions of the user. The present invention comprises a multitude of instructions; the following list of instructions is exemplary and is not intended to be exhaustive.

Instructions of the loaded and executed computer programme concern at least one of:

- The measurement of a sequence of brightness values 180, 180',180" of at least one 2D image point 121,121' of the captured 2D image 120,120'.
- The calculation of a 3D coordinate 21 of a correlated object point 20 from the measured sequence of brightness values 180,180',180" of the 2D image point 121, 121'.
- The determination of whether a sequence of brightness values 180,180',180" of a particular 2D image point 121, 121' comprises ambiguity.
- The linkage of a particular 2D image point 121,121' with the 3D image point 131 of the correlated object point 20.
- The extraction of a 3D coordinate 21 of the correlated object point 20 from the linked 3D image point 131.
- The determination of whether a sequence of brightness values 180,180',180" from a first point of view 12\* is similar to sequence of brightness values 180,180',180" from a second point of view **12\*\***.
- The determination of whether a sequence of brightness values 180,180',180" from a first point of view 12\* lacks similarity with a sequence of brightness values 180,180',180" from a second point of view **12\*\*, in case of lacking similarity, the linkage of a particular 2D image point 121,121' for which the sequences of brightness values 180,180',180" from the first and second point of view 12\*,12\*\* lack similarity with the 3D image point 131 of the correlated object point 20 and the extraction of a 3D coordinate 21 of the correlated object point 20 from the linked 3D image point 131**.
- The linkage of the coordinate of a particular 2D image point 121,121' with the coordinate of a reference point.
- The determination of a size ratio of the CCD or CMOS sensor of the PSA camera 12,12' and a CCD or CMOS sensor of the TOF camera 13.
- The usage of the coordinate of the particular 2D image point 121,121' and the size ratio of the CCD or CMOS sensor of the PSA camera 12,12' and the CCD or CMOS sensor of the TOF camera 13 for calculating a coordinate of the particular 3D image point 131, which coordinate of the particular 3D image point 131 precisely locates a pixel on a CCD or CMOS sensor of the TOF camera 13.
- The linkage of the coordinate of a reference point with the coordinate of a particular 3D image point 131.
- The repetition of the steps of the method for obtaining a plurality of 3D coordinates 21 of correlated object points 20 and of particular correlated object points for determining a 3D shape representation 200 of the object 2.
- The display of the latest determined 3D shape representation 200 of the object 2 on the display device 15,35.
- The display of the latest determined 3D shape representation 200 of the object 2 alone or in combination with the latest 3D image representation 152,352 of the object 2 on the display device 15,35.

Figure 9:
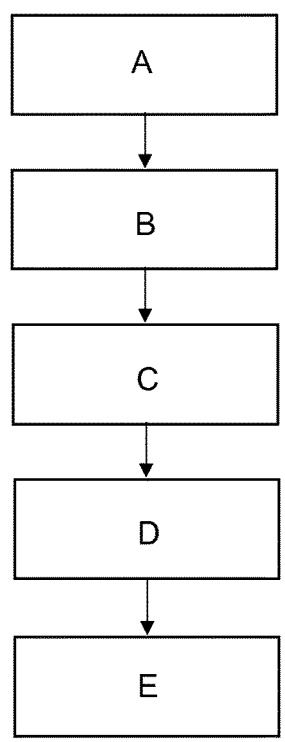
FIG. 9 shows a first flow diagram with steps of the method for determining 3D coordinates of an object by an optical measuring device according to FIG. 6.

FIG. 9 is a diagram with steps of the method of present invention. The computer programme of the computing means 18 interprets instructions and controls the optical measuring device 1 to perform the steps A to E of the method accordingly.

In step A, the projector device 11 illuminates the object 2 with a sequence of predefined patterns 10. In step B, the PSA camera 12,12' captures a sequence of 2D images 120,120' of the patterns 10 as reflected from the object 2. In step C, the computer programme of the computing means 18 measures a sequence of brightness values 180,180',180" of at least one 2D image point 121,121' from the captured 2D image 120,120'. In step D, the computer programme of the computing means 18 calculates a 3D coordinate 21 of an object point 20 which is correlated with the measured sequence of brightness values 180,180',180" of the 2D image point 121,121'. In step E, the TOF camera 13 captures at least one 3D image 130 of the object 2, the 3D image 130 includes a 3D image point 131 of the correlated object point 20.

Figure 10:
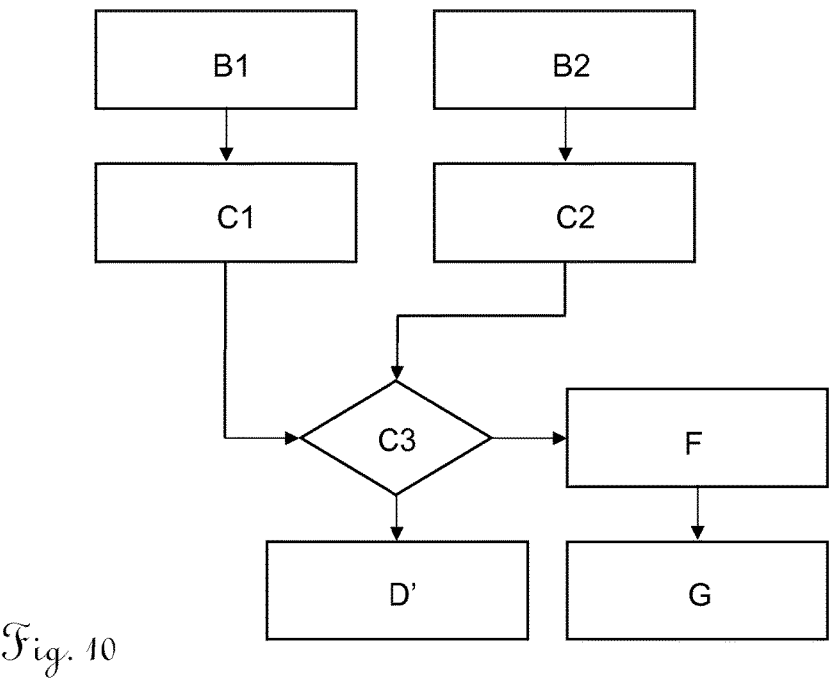
FIG. 10 shows a second flow diagram with steps of the method for determining 3D coordinates of an object by an optical measuring device according to FIG. 6.

FIG. 10 is another diagram with steps of the method of the present invention. The computer programme of the computing means 18 interprets instructions and controls the optical measuring device 1 to perform the steps B1, B2, C1, C2, C3, D1 and F of the method accordingly.

In step B1, a first PSA camera 12 captures a sequence of 2D images 120 of the patterns 10 from a first point of view 12*. In step B2 a second PSA camera 12' captures the same sequence of 2D images 120' of the patterns 10 simultaneously from a second point of view 12. In step C1, the computer programme of the computing means 18 measures a sequence of brightness values 180,180',180" of a 2D image point 121 from the 2D images 120 from the first point of view 12*. In step C2, the computer programme of the computing means 18 measures a sequence of brightness values 180,180',180" of a 2D image point 121' from the 2D images 120' from the second point of view 12**. In step C3, the computer programme of the computing means 18 determines whether the sequence of brightness values 180,180', 180" from the first point of view 12* is similar to the sequence of brightness values 180,180',180" from the second point of view 12****.

In case of similarity, the computer programme of the computing means 18 calculates in step D' a 3D coordinate 21 of a correlated object point 20 from the measured sequences of brightness values 180,180',180" for at least one of the 2D image points 121, 121'. In case of lacking similarity, the computer programme of the computing means 18 links in step F the particular 2D image point 121, 121' for which the sequence of brightness values 180, 180', 180" from the first and second point of view **12*, 12* lack similarity with a particular 3D image point 131 of a particular correlated object point 20 and extracts in step G a 3D coordinate 21 of the particular correlated object point 20 from the linked particular 3D image point 131**.

The steps of the method may be repeated for obtaining a plurality of 3D coordinates 21 of correlated object points 20 and of particular correlated object points for determining a 3D shape representation 200 of the object 2. The 3D shape representation 200 of the object 2 may comprise several thousand object points 20.

Figure 11:
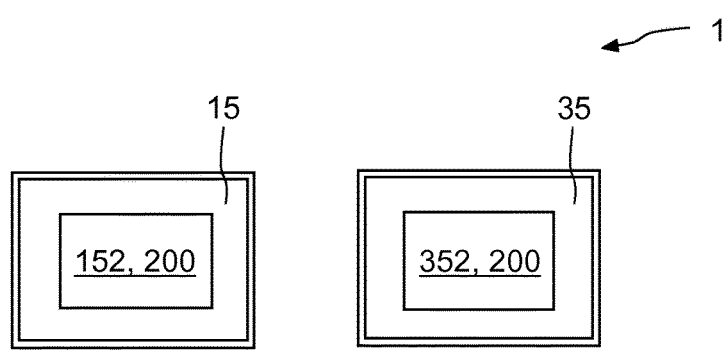
FIG. 11 shows an exemplary embodiment of a 3D shape representation of an object determined by the optical measuring device according to FIG. 6.

According to FIG. 11, the latest determined 3D shape representation 200 of the object 2 may be displayed on the display device 15,35. The latest determined 3D shape representation 200 of the object 2 may be displayed alone or in combination with the latest 3D image representation 152, 352 of the object 2 on the display device 15,35. As the determination of a 3D shape representation 200 takes several hundred milliseconds, and as the TOF camera 13 has a frame grabber rate of down to ten milliseconds, the combined display of the latest determined 3D shape representation 200 of the object 2 and of the latest 3D image representation 152,352 has the advantage, that the 3D shape representation 200 of the object 2 provides an accurate representation of the object 2 and that the 3D image representation 152,352 provides a fast real time video imaging of the object 2.

Although the invention is illustrated above, partly with reference to some preferred embodiments, it must be understood that numerous modifications and combinations of different features of the embodiments can be made. All of these modifications lie within the scope of the appended claims.

What is claimed is:

1. Method for determining 3D coordinates of an object by an optical measuring device, the method comprising:
   a structured-light 3D measurement of 3D coordinates of the object with:
   illuminating the object with a temporal sequence of varying predefined patterns;
   capturing a temporal sequence of 2D images of the sequence of varying predefined patterns as reflected from the object;
   measuring a temporal sequence of brightness values of at least one 2D image point from the temporal sequence of 2D images;
   capturing with a time-of-flight (TOF) camera at least one range image of the object, the range image comprising distance information of a plurality of points of the object; and
   calculating the 3D coordinates of the object point which is correlated with the measured temporal sequence of brightness values of the 2D image point according to a distortion of the 2D images of the reflected sequence of varying predefined patterns relative to a reference of the illuminating sequence of varying predefined patterns, which distortion is caused by the 3D shape representation of the object;
   considering the range image in the calculation of the 3D coordinate; and
   using the range image for dissolving an ambiguity in the calculation of the 3D coordinate of the structured-light 3D measurement.

2. The method according to claim 1, wherein the method further comprises:
   determining, whether a temporal sequence of brightness values of a 2D image point comprises the ambiguity; and
   in case of the ambiguity, using the distance information of at least one point of the plurality of points of the object for dissolving the ambiguity.

3. The method according to claim 1, further comprising:
   capturing an amplitude image of the object, the amplitude image comprising a brightness information for each of the plurality of points, wherein for dissolving the ambiguity in the calculation of the 3D coordinate the range image and the amplitude image are combined to a 3D image of the object.

4. The method according to claim 1, further comprising:
   determining, whether a temporal sequence of brightness values of a particular 2D image point comprises the ambiguity; and
   in case of the ambiguity:
   linking the particular 2D image point with a particular 3D image point of a particular correlated object point in the range image; and extracting a 3D coordinate of the particular correlated object point from the linked particular 3D image point of the range image to resolve the ambiguity.

5. The method according to claim 1, further comprising wherein:
capturing a temporal sequence of 2D images of the patterns from a first point of view;
capturing the same temporal sequence of 2D images of the patterns simultaneously from a second point of view;
measuring a temporal sequence of brightness values of a 2D image point from 2D images from the first point of view;
measuring a temporal sequence of brightness values of a 2D image point from 2D images from the second point of view;
determining whether the temporal sequence of brightness values from the first point of view is similar to the temporal sequence of brightness values from the second point of view; and
in case of similarity, calculating a 3D coordinate of a correlated object point from the measured temporal sequences of brightness values of the 2D image point; or
in case of lacking similarity:
linking the particular 2D image point for which the temporal sequences of brightness values from the first and second point of view lack similarity with a particular 3D image point of a particular correlated object point, and
extracting a 3D coordinate of the particular correlated object point from the linked particular 3D image point.

6. The method according to claim 5, further comprising:
measuring a temporal sequence of brightness values for a plurality of 2D image points from 2D images from the first and second point of view;
determining for at least one of the plurality of 2D image points, whether the temporal sequence of brightness values from the first point of view is similar to the temporal sequence of brightness values from the second point of view;
in case of similarity, calculating at least one 3D coordinate of a correlated object point from the temporal measured sequence of brightness values for at least one of the plurality of 2D image points;
in case of lacking similarity:
linking at least one particular 2D image point for which the temporal sequences of brightness values from the first and second point of view of lacking similarity with a particular 3D image point of a particular correlated object point, and
extracting at least one 3D coordinate of the particular correlated object point from the linked particular 3D image point; and
determining a 3D shape representation of the object from the plurality of 3D coordinates of correlated object points and of particular correlated object point.

7. The method according to claim 6, further comprising:
repeating the steps of claim 6; and
displaying:
the latest determined 3D shape representation of the object; and/or
the latest 3D image representation of the object.

8. The method according to claim 1, wherein: a triangulation of the 3D coordinate of the correlated object point by the predefined patterns is comprised in the structured-light 3D measurement.

9. The method according to claim 8, wherein: the triangulation comprises a device distance and a illumination angle enclosed by the projected and the captured patterns.

10. An optical measuring device for determining 3D coordinates of an object, the optical measuring device comprising:
a projector device for illuminating the object with a temporal sequence of varying predefined patterns;
at least one photosensor array (PSA) camera for capturing a temporal sequence of 2D images of the temporal sequence of varying predefined patterns as reflected from the object;
a time-of-flight (TOF) camera for capturing at least one range image of the object, the range image including distance information of a plurality of range image points of the object; and
a computing device for:
measuring a temporal sequence of brightness values of at least one 2D image point from the temporal sequence of 2D images; and
calculating a 3D coordinate of an object point which is correlated with the temporal sequence of measured brightness value of the 2D image point by a structured-light 3D measurement of 3D coordinates of the object according to a distortion of the 2D images of the reflected sequence of varying predefined patterns relative to a reference of the predefined patterns, which distortion to the predefined patterns is caused by the 3D shape representation of the object, with a triangulation of the 3D coordinate of the correlated object point in the structured-light 3D measurement; and
using range image is used for dissolving an ambiguity in the calculating of the 3D coordinate by the structured-light 3D measurement.

11. The optical measuring device according to claim 10, wherein:
the projector device, the PSA camera and the TOF camera are rigidly mounted in a housing of the optical measuring device.

12. The optical measuring device according to claim 10, wherein:
the computing device is configured for determining whether a temporal sequence of brightness values of a particular 2D image point comprises an ambiguity;
in case of the ambiguity:
the computing device is configured for linking the particular 2D image point with a particular 3D image point of a particular correlated object point; and
the computing device is configured for extracting a 3D coordinate of the particular correlated object point from the linked particular 3D image point.

13. The optical measuring device according to claim 10, comprising:
a first photosensor array (PSA) camera for capturing a temporal sequence of 2D images of the patterns from a first point of view;
a second PSA camera for capturing the same temporal sequence of 2D images of the patterns simultaneously from a second point of view;

the computing device is configured for measuring a temporal sequence of brightness values of a plurality of 2D image points from 2D images from the first and second point of view;

the computing device is configured for determining for at least one of the plurality of 2D image points, whether the temporal sequence of brightness values from the first point of view is similar to the temporal sequence of brightness values from the second point of view;

the computing device is configured for calculating in case of similarity a 3D coordinate of a correlated object point from the measured temporal sequence of brightness values for at least one of the plurality of 2D image points;

the computing device is configured for linking in case of lacking similarity at least one particular 2D image point for which the temporal sequences of brightness values from the first and second point of view lack similarity with a particular 3D image point of a particular correlated object point;

the computing device is configured for extracting in case of lacking similarity at least one 3D coordinate of the particular correlated object point from the linked particular 3D image point; and the computing device is configured for determining a 3D shape representation of the object from the plurality of 3D coordinates of correlated object points and of particular correlated object point, wherein the optical measuring device comprises a display device for displaying the latest determined 3D shape representation of the object and/or for displaying the latest 3D image representation of the object.

14. The optical measuring device according to claim 13, wherein:

the PSA camera issuing a 2D image signal with a coordinate of the particular 2D image point, which coordinate of the particular 2D image point precisely locates a pixel on a CCD or CMOS sensor of the PSA camera;

the computing device is configured for determining a size ratio of the CCD or CMOS sensor of the PSA camera and a CCD or CMOS sensor of the TOF camera; and the computing device is configured for using the coordinate of the particular 2D image point and the size ratio of the CCD or CMOS sensor of the PSA camera and the CCD or CMOS sensor of the TOF camera for calculating a coordinate of the particular 3D image point, which coordinate of the particular 3D image point precisely locates a pixel on a CCD or CMOS sensor of the TOF camera.

15. The optical measuring device according to claim 10, the computing device being configured for:

deriving a distance information of a plurality of points of the object according to a time-of-flight principle to form at least one range image that is used in calculation of the 3D coordinate, wherein the range image is used for dissolving the ambiguity in the calculating of the 3D coordinate by the structured-light 3D measurement.

16. The optical measuring device according to claim 15, wherein in case of an ambiguity in the temporal sequence of brightness values of a particular 2D image point:

linking the particular 2D image point with a particular 3D image point of a particular of the correlated object points in the range image; and extracting a 3D coordinate of the particular correlated object point from the linked particular 3D image point of the range image to resolve the ambiguity.

17. A non-transitory computer program product, having computer-executable instructions for performing a method for determining 3D coordinates of an object when run on the computing device of an optical measuring device according to claim 5, the method comprising:

receiving a temporal sequence of brightness values, of at least one 2D image point of the object, receiving distance information of a plurality of points of the object, and calculating a 3D coordinate of an object point which is correlated with the temporal sequence of brightness values of the 2D image point, wherein the distance information of at least one point of the object is considered in the calculation of the 3D coordinate.

* * * * *